Aug. 20, 1957 W. R. MARSHALL 2,803,039
CONTINUOUS PLASTIC MILLING
Filed Dec. 10, 1953 3 Sheets-Sheet 1

INVENTOR
WALTER R. MARSHALL
BY
Richard S. Shreve Jr.
ATTORNEY

INVENTOR
WALTER R. MARSHALL
BY
Richard S. Shreve Jr
ATTORNEY

Aug. 20, 1957  W. R. MARSHALL  2,803,039
CONTINUOUS PLASTIC MILLING
Filed Dec. 10, 1953  3 Sheets-Sheet 3
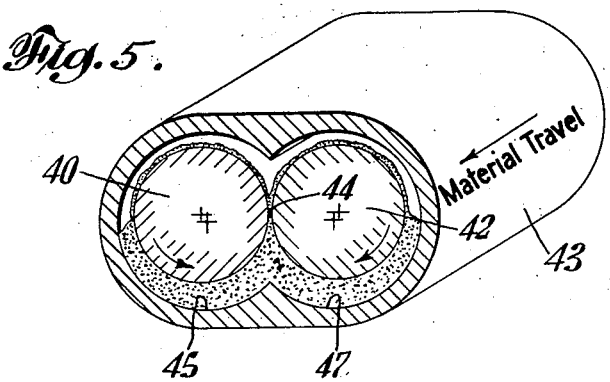
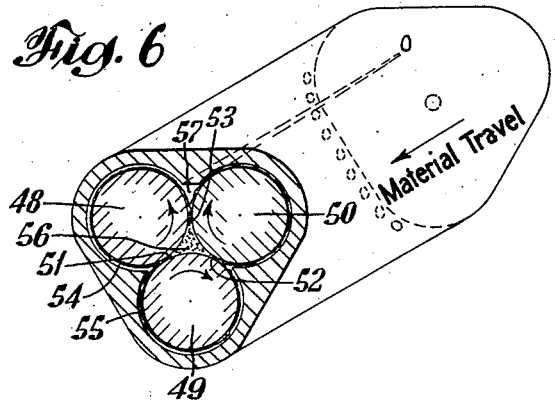
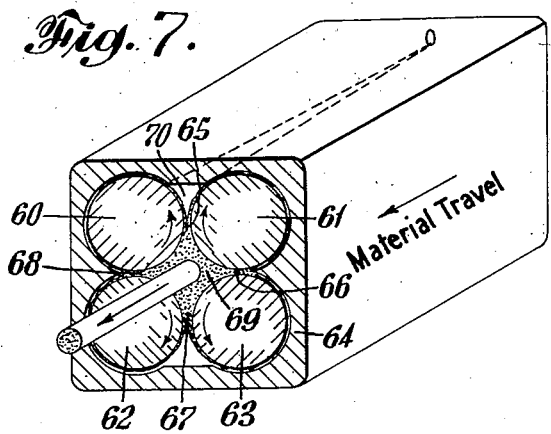
INVENTOR
WALTER R. MARSHALL
BY
Richard S. Shreve, Jr.
ATTORNEY United States Patent Office 2,803,039
Patented Aug. 20, 1957

2,803,039

CONTINUOUS PLASTIC MILLING

Walter R. Marshall, Bloomfield, N. J., assignor to Union Carbide Corporation, a corporation of New York Application December 10, 1953, Serial No. 397,457

14 Claims. (Cl. 18—2)

This invention relates to method and apparatus for continuous plastic milling, and more particularly to a roll compounding unit and continuous process for milling plastics therewith providing uniform flow rates throughout the plastic handling system of which it is a part.

Heretofore plastic compounding units have been designed wherein a milling roll was so positioned with respect to a housing therefor as to provide therebetween a convergent space decreasing in the direction of roll rotation to a plastic milling bite. The principal difficulty experienced in the operation of such unit has been to control the flow of material along the rolls and through the outlet, particularly in continuous processes.

Due to changes in pressure caused by changes in temperature, viscosity and speed of rolls encountered in the milling of plastics, irregular flow can occur, and when it does it brings about an uneven delivery of material in an extrusion head, to sheeting rolls, or subsequent processing equipment. Such irregular flow must be easily and readily controllable, otherwise the uneven delivery of material results in uneven or in a non-uniform sheet, breaking the sheet, too slow or too rapid delivery of the material to the extruder or to sheeting rolls for proper handling, and in general difficulty in proper processing the material after it leaves the compounding unit.

The main object of the present invention is to avoid or minimize these difficulties in operation. This is accomplished by having the roll so positioned with respect to the housing that the annular space between the roll and housing does not converge in the direction of the rolls. Instead, the roll is so positioned that the annular space between roll and housing in the pressure area ahead of the bite is either divergent or preferably of unvarying radial width in the direction of roll rotation.

In the drawings:

Figure 5 is an isometric view of a two roll mill with a divergent eccentric casing;

Figure 6 is an isometric view of a three roll mill; and

Figure 7 is an isometric view of a four roll mill.

Figure 1:
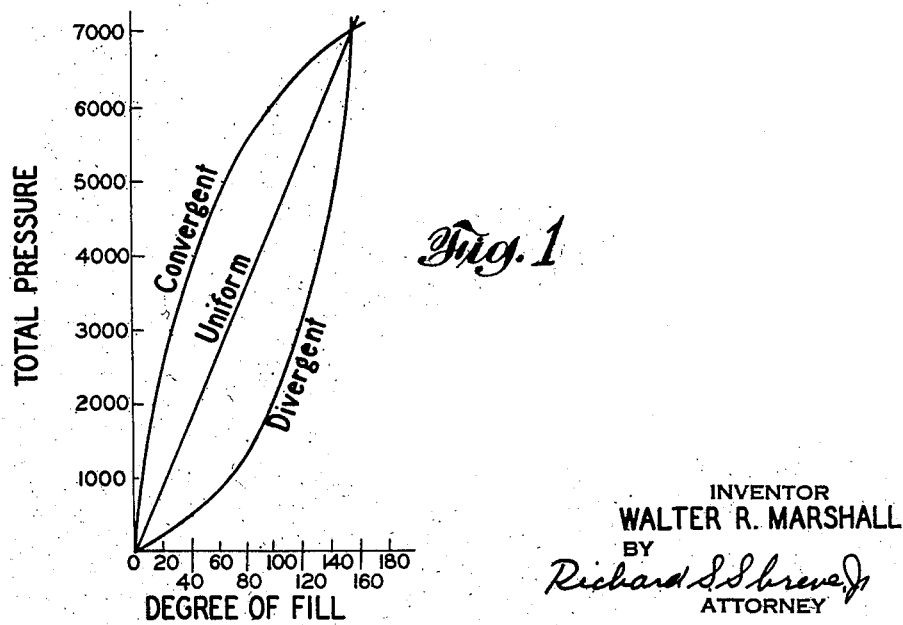
Figure 1 is a curve of total pressure against degree of fill under three sets of conditions.

In a continuous process the flow of material from the unit should be uniform and it should deliver a constant amount of material to the processing units following it in the system. If for any reason the delivery of material is accelerated or retarded or interrupted the subsequent processing of the material is beset with difficulties. Such irregular delivery is usually the result of a change in the pressure developed in the mill which can be brought about for example by a change in the temperature, viscosity or speed of roll rotation. A retarded output is usually accompanied by a massing of material which is generally accentuated toward the inlet end of the compounding unit. Such accumulated material then becomes a critical factor in determining the extent to which the unit responds to these changes in pressure, since according to the analysis given above, pressure development corresponds to the conformation of the annular space and its degree of fill.

For example in the compounding units which have been previously proposed and which are provided with an annular space in the pressure area between roll and housing which is convergent in the direction of roll rotation the output pressure is progressively more slowly increased the greater the degree of fill. Moreover, there is a considerable delay in pressure increase before sufficient pressure is developed to restore the desired output flow. Further, when sufficient pressure finally develops the quantity of material that has accumulated is so large that for a period of time there is an excessive flow of material and equilibrium conditions are restored only with difficulty.

However, if the compounding unit is provided with an annular space in the pressure area between roll and housing which is divergent in the direction of roll rotation the output pressure increases progressively more rapidly but non-uniformly with degree of fill. This pressure could under certain conditions (such as a surge in the feed particularly where the divergence of the annular space is accentuated) develop so rapidly that flow along the rolls would be so markedly accelerated that the quantity of material delivered at the outlet is greater than can be utilized by subsequent processing equipment. Nevertheless, a certain amount of divergence may be advantageous to provide quick pressure acceleration and such design is not without the scope of my invention. In general, the divergence can be such that the radial width of the narrowest part of the annular space between roll and housing in the pressure area is at least twice the radial width of the bite.

In the compounding unit where the annular space is of uniform conformation and which is the preferred design contemplated in my invention outlet pressure increases linearly with degree of fill. Any retardation or interruption therefore in flow of material along the rolls and through the outlet is readily controllable. Any change in outlet flow which brings about increase in the degree of fill causes an immediate increase in pressure. Further this development of pressure is rapid and uniform and therefore equilibrium conditions of pressure and flow are quickly and controllably reestablished. The annular space may be of uniform conformation, the entire length of the roll section or only a major portion of that length.

Figure 2:
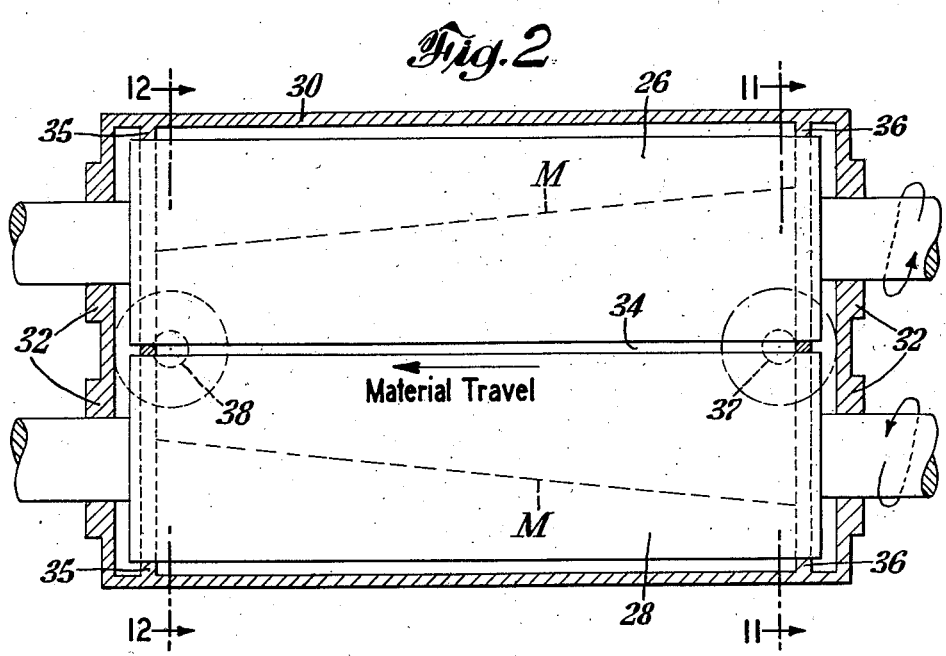
Figure 2 is a horizontal section through a two roll mill according to one embodiment of the present invention.
Figure 3:
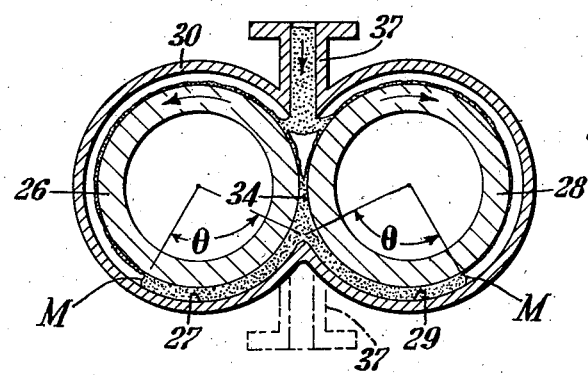
Figure 3 is a vertical section through the inlet, taken along line 3—3 of Fig. 2.
Figure 4:
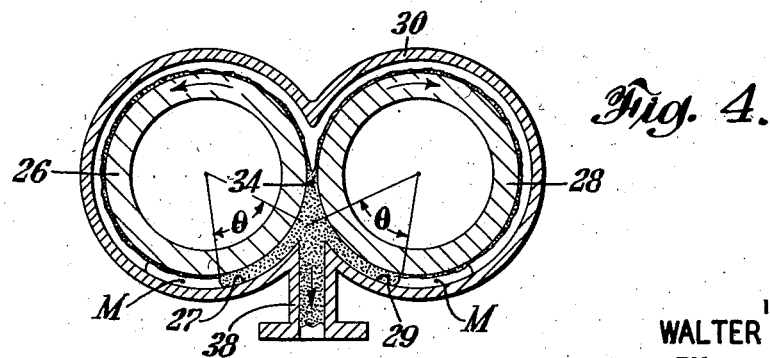
Figure 4 is a vertical section through the outlet, taken along line 4—4 of Fig. 2.

The apparatus shown in Figs. 2, 3 and 4 comprises two smooth surfaced cylindrical rolls 26 and 28 mounted in parallel relationship to each other in a housing 30 of substantially figure 8 cross section having longitudinally parallel transversely intersecting smooth surfaced bores of larger diameter than the rolls 26 and 28 which are respectively concentrically mounted therein. The shaft ends of the rolls rotate in opposite directions in bearings 32 at each end of the housing 30, the roll 26 rotating counterclockwise and the roll 28 clockwise.

For two equivalent rolls in equivalent bores the rolls are spaced apart a distance less than about three-fourths the difference between roll and bore radii to form a milling clearance 34 at the bite therebetween.

Seals 35 and 36 are positioned at the ends of the rolls 26 and 28 to effectively seal off each end of the double annular or figure 8 space between the rolls and the housing 30. An inlet 37 for introducing plastic material to the roll surfaces is positioned at the end of the housing adjacent the seal 36. An outlet 38 for discharging milled plastic material is located at the other end of the housing adjacent the seal 35.

The concentric mounting of the rolls 26 and 28 within the intersecting bores of the housing 30 provide curved nonconvergent specifically annular spaces 27 and 29 approaching the bite 34 from each side in the direction of rotation for a distance determined in the angle theta, and extending longitudinally along both rolls for the full length thereof which may be filled as indicated by the marginal lines MM in Fig. 2 when the mill is operating on plastic material.

In operation of the mill shown in Figs. 2, 3 and 4, plastic material fed through the inlet 37 meets the diverging surfaces of rolls 26 and 28, divides and rides around inside the housing to enter the milling bite 34. The parts of the plastic material nearest the roll surface may be mixed in before passing through the bite 34, but the excess is held back by the rollers acting as dams, and fill the annular space 27 and 29 indicated by the angle theta. The pressure thus built up propels the material through the mill and on through the outlet 38.

In the form shown in Fig. 5, the mill comprises two rolls 40 and 42 mounted in parallel relationship in a housing 43 of substantially figure 8 cross section having intersecting bores of larger diameter than the rolls which are eccentrically mounted therein.

The eccentric mounting of the rolls 40 and 42 within the intersecting bores of the housing 43 provide curved nonconvergent, specifically divergent spaces 45 and 47 approaching the bite 44 from each side in the direction of rotation. In other respects this form is similar to that shown in Figs. 2, 3 and 4 and operates in a similar fashion, except that the total pressure increases progressively more rapidly with the degree of fill.

In the three roll mill shown in Fig. 6 the rolls 48, 49 and 50 are mounted in parallel equilateral relation in a housing of substantially trefoil cross section, having doubly intersecting bores of larger diameter than the rolls which are respectively concentrically mounted therein and spaced apart a distance less than the difference in radii to form milling clearances 51, 52 and 53 between respective pairs of the rolls. The roll 48 rotates counterclockwise and the rolls 49 and 50 both rotate clockwise.

The concentric mounting provides curved nonconvergent specifically annular spaces 54 and 55 approaching the bite 51 from each side in the direction of rotation. The equilateral positioning provides a substantially triangular channel 56 extending longitudinally of the mill, and which is defined only by moving roll surfaces, and which minimizes dead pockets or unswept areas not contacted by active roll surfaces.

The cusp of the trefoil housing above the bite 53 between the rolls 48 and 50 may be cut off to form a triangular longitudinally extending channel 57 which serves as a vapor outlet.

In the square type mill shown in Figure 7, four rolls 60, 61, 62 and 63 are mounted on parallel axes in a housing 64 having four intersecting bores of larger diameter than the rolls which are respectively concentrically mounted therein, adjacent pairs thereof being spaced apart a distance less than the difference in radii to form milling clearances 65, 66, 67 and 68 therebetween. The rolls 60 and 63 rotate counterclockwise and the rolls 61 and 62 clockwise, so that the rolls of all adjacent pairs rotate in opposite directions.

The square spacing of the rolls provides a four sided channel 69 extending longitudinally of the mill, and bounded only by moving roll surfaces. The cusp of the housing 64 above the bite 65 between the rolls 60 and 61 may be cut off to form a triangular longitudinally extending channel 70 which serves as a vapor outlet.

What is claimed is:

1. In a process for milling normally solid plastic material by a rotating surface of revolution and a curved stationary surface positioned with respect to said rotating surface to provide between the respective surfaces a nonconvergent zone in the direction of rotation and terminating in a milling clearance longitudinally along the rotating surface, said zone having an orifice for discharging milled plastic material, which comprises compounding the plastic by introducing it as a viscous adhesive mass into the nonconvergent zone, milling the plastic by rotating the surface of revolution to adhesively drag the viscous plastic mass into said zone in an amount larger than that which can completely pass through said milling clearance to thereby subject the viscous mass in said zone to shear and pressure, the nonconvergence of said zone maintaining the total pressure always at least proportional to the degree of fill of the housing space, and discharging the milled plastic by longitudinal moving the plastic along the nonconvergent zone to the discharge orifice by means of said pressure.

2. In a continuous process for milling plastic material by a surface of revolution on a rotor, a similarly surfaced stator concentrically positioned with respect to the rotor to form therewith an annular zone approaching a milling clearance, and extending longitudinally along a portion of the peripheral surface of the rotor, which comprises applying the plastic in a viscous adhesive condition to the peripheral surface of the rotor, milling the plastic by rotating the rotor to continuously drag the viscous plastic adhering to its surface into the annular zone to fill the zone with plastic at a rate maintaining the plastic therein under pressure proportional to the degree of fill of the housing space, and moving the plastic in said zone longitudinally along the rotor surface by means of said pressure.

3. In a process for progressively milling plastic material by a rotating surface of revolution rotating within a similarly surfaced casing and forming therewith longitudinally along a portion of the periphery of the rotor a diverging zone terminating in a milling clearance in the direction of rotation, which comprises reducing the plastic to a viscous adhesive mass, adhesively applying the plastic to the roll surface, milling the plastic by rotating the roll at a speed to carry the plastic adhering thereto into the diverging zone in an amount filling the zone with plastic under pressure increasing progressively more rapidly with the degree of fill of the housing space, and moving the plastic in said zone longitudinally along the rotor surface by means of said pressure.

4. In a continuous process for milling a normally solid plastic material by a pair of mixing rolls having surfaces of revolution rotating in opposite directions within a casing of substantially figure 8 cross section, and forming therewith respective nonconverging zones approaching the bite between said rolls and extending longitudinally along the periphery of said rotors, which comprises reducing the plastic to a viscous adhesive mass, adhesively applying the viscous plastic to the roll surfaces, milling the plastic by rotating the rolls to drag the adherent plastic into the nonconvergent approaches up to the bite region, and generating pressure on the plastic confined therein with pressure increasing progressively more rapidly than the degree of fill of the housing space, and discharging the milled plastic by moving the plastic longitudinally by means of said pressure.

5. Apparatus for milling and conveying plastic material comprising in combination, a rotor having a surface of revolution, a stationary surface at least partially encircling the rotor, and positioned with respect to the rotor to form therebetween a nonconverging space leading to a plastic milling clearance and extending longitudinally along and circumferentially around a portion of the periphery of the rotor for the greater part of the length thereof.

6. Apparatus for milling and conveying plastic material comprising in combination a rotor having a surface of revolution, a stationary surface at least partially enclosing said rotor, and having a longitudinal portion projecting toward the rotor and terminating at a plastic milling distance from the rotor surface to form a nonconvergent space between the rotor and the stationary surface.

7. Apparatus for milling and conveying plastic material comprising a rotor having a surface of revolution and a concave stationary surface at least partially encircling said rotor, and of greater radius of curvature, and positioned with respect to said rotor to provide between the respective surfaces a nonconvergent space approaching a milling clearance in the direction of rotation of said rotor and extending longitudinally along a portion of the periphery of the rotor for the greater part of the length thereof.

8. Apparatus for milling and extruding plastic material comprising in combination a rotor having a smooth surface of revolution, a stationary surface at least partially enclosing the rotor and having a longitudinal portion projecting towards the rotor, and terminating at a plastic milling clearance from the rotor surface to form a nonconvergent space between the rotor and the stationary surface, and a passageway through the stationary surface communicating with the nonconvergent space for discharging vapor.

9. Apparatus for milling and conveying plastic material comprising in combination a rotor having a surface of revolution, and a concave stationary surface at least partially encircling said rotor, and positioned with respect to said rotor to provide therebetween a nonconverging space approaching a milling clearance in the direction of rotation of said rotor, and extending longitudinally along a portion of the periphery of said rotor for the greater part of the length thereof, a seal on one longitudinal end of said nonconverging space, and means for feeding plastic to the rotor at a point adjacent to said seal.

10. Apparatus for milling and extruding plastic material, comprising in combination a rotor having a surface of revolution, a casing having a concave interior wall at least partially enclosing said roll, a longitudinal dam on said walls projecting inward to form a plastic milling clearance, said concave wall having a greater radius of curvature than said rotor, and positioned to form a nonconvergent space between the roll and interior wall of the casing, a seal at each longitudinal end of said space between the roll and the casing, and a passageway through the casing communicating with the nonconvergent space for discharging plastic material.

11. Apparatus for milling and conveying plastic material, comprising in combination a journaled base, a pair of rolls mounted on said journaled base for rotation in opposite directions, and with a plastic milling clearance therebetween, a casing having interior walls at least partially encircling each of said rolls, and enclosing the bite area between said rolls, said walls being separated from the rolls by non-converging zones approaching the milling clearance in the respective directions of rotation of the rolls.

12. Apparatus for milling and conveying plastic material, comprising in combination a journaled base, a pair of rolls mounted on said journaled base for rotation in opposite directions, and with a plastic milling clearance therebetween, a casing having interior walls at least partially encircling each of said rolls, and enclosing the bite area between said rolls, said walls being separated from the rolls by non-converging zones approaching the milling clearance in the respective directions of rotation of the rolls, a seal at one end of said casing to confine plastic material in the milling clearance between the rolls and casing walls, and means for feeding plastic material in the rolls adjacent to the sealed end thereof.

13. Apparatus for continuous milling and extrusion a plastic material comprising in combination, a pair of cylindrical mixing rolls, a housing enclosing and supporting the rolls for rotation in opposite directions with a milling clearance therebetween, said housing having longitudinally parallel, transversely intersecting cylindrical bores of greater radius of curvature than said rolls, and concentrically at least partially enclosing said rolls to provide nonconvergent spaces approaching said milling clearance from each side, said housing having an entrance for plastic material in said nonconvergent spaces between the rolls and said housing, a seal at each end of said housing to confine plastic material within said nonconvergent spaces, and a passageway through the housing for discharging milled plastic material.

14. Apparatus for continuous milling of plastic material, comprising in combination, a pair of rotatable, smooth surfaced, longitudinal cylinders separated from each other by a milling clearance to form a bite for milling the plastic, a housing enclosing and supporting said cylinders for rotation in opposite directions, said housing having a chamber at least partially encircling each of said cylinders, and including said milling bite, said chamber having a total minimum clearance from the cylinders not less than the bite clearance between the rolls and clearance in each direction away from said milling bite to form on each side thereof, a nonconvergent zone approaching said bite, a seal at each end of said chamber for confining plastic material within the nonconvergent zone and milling bite of the cylinders, and a passageway through the housing for discharging milled plastic material confined by said seals.

References Cited in the file of this patent

UNITED STATES PATENTS

| | | |
|---|---|---|
| 2,571,760 | Rathbun | Oct. 16, 1951 |
| 2,573,825 | Banovsky et al. | Nov. 6, 1951 |
| 2,645,813 | Swallow | July 21, 1953 |